United States Patent
Shukla et al.

(10) Patent No.: US 10,872,420 B2
(45) Date of Patent: Dec. 22, 2020

(54) ELECTRONIC DEVICE AND METHOD FOR AUTOMATIC HUMAN SEGMENTATION IN IMAGE

(71) Applicant: Samsung Electronics Co., Ltd., Suwon-si (KR)

(72) Inventors: Alok Shankarlal Shukla, Bengaluru (IN); Mahesh Putane Jagadeeshrao, Bengaluru (IN); Nitin Kumar Singh, Bengaluru (IN); Divay Bhutani, Bengaluru (IN); Nitin Kamboj, Bengaluru (IN); Manoj Kumar Marram Reddy, Bengaluru (IN); Prasanna Kumar Avanigadda, Bengaluru (IN); Sanket Sambhajirao Deshmukh, Bengaluru (IN); Insung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/126,636

(22) Filed: Sep. 10, 2018

(65) Prior Publication Data
US 2019/0080457 A1    Mar. 14, 2019

(30) Foreign Application Priority Data

Sep. 8, 2017  (IN) .............................. 201741031861
Sep. 4, 2018  (IN) .............................. 201741031861

(51) Int. Cl.
*G06T 7/194*  (2017.01)
*G06K 9/00*   (2006.01)
(Continued)

(52) U.S. Cl.
CPC .......... *G06T 7/194* (2017.01); *G06K 9/00228* (2013.01); *G06K 9/00362* (2013.01);
(Continued)

(58) Field of Classification Search
None
See application file for complete search history.

(56) References Cited

U.S. PATENT DOCUMENTS 6,697,502 B2 *  2/2004  Luo .................... G06K 9/00228
                                                   382/115
7,532,743 B2     5/2009  Morisada
(Continued)

FOREIGN PATENT DOCUMENTS

JP    2005-078376 A       3/2005
JP    2005078376 A  *     3/2005   ......... G06K 9/00228
(Continued)

OTHER PUBLICATIONS

Qu, S.—"The Human Image Segmentation Algorithm Based on Face Detection and Biased Normalized Cuts"—Sep. 2015—CCCV 2015, pp. 134-143 (Year: 2015).*

(Continued)

*Primary Examiner* — Bernard Krasnic
(74) *Attorney, Agent, or Firm* — Jefferson IP Law, LLP

(57) ABSTRACT

An electronic device and a method for human segmentation in an image are provided. The method includes obtaining the image comprising at least one human, performing face detection to detect the human in the image, generating a first human segmentation from the image by comparing a predefined full human body template and the detected human, generating a second human segmentation from the image, by inputting the image to an artificial intelligence trained model and obtaining a composite human segmentation representing the detected human by using both of the first human segmentation and the second human segmentation.

16 Claims, 13 Drawing Sheets

(51) Int. Cl.
  *G06T 5/00* (2006.01)
  *G06T 7/521* (2017.01)
  *G06N 3/02* (2006.01)
  *G06T 5/20* (2006.01)
  *G06N 20/00* (2019.01)
  *G06K 9/62* (2006.01)
  *G06T 7/11* (2017.01)
  *G06K 9/34* (2006.01)

(52) U.S. Cl.
  CPC .............. *G06K 9/629* (2013.01); *G06N 3/02* (2013.01); *G06N 20/00* (2019.01); *G06T 5/002* (2013.01); *G06T 5/003* (2013.01); *G06T 5/20* (2013.01); *G06T 7/11* (2017.01); *G06T 7/521* (2017.01); *G06K 9/342* (2013.01); *G06T 2207/30196* (2013.01); *G06T 2207/30201* (2013.01)

(56) References Cited

U.S. PATENT DOCUMENTS

| | | | |
|---|---|---|---|
| 8,320,680 | B2 | 11/2012 | Sakai |
| 9,569,854 | B2 | 2/2017 | Wu et al. |
| 2006/0126093 | A1* | 6/2006 | Fedorovskaya .... G06K 9/00255 358/1.14 |
| 2011/0216976 | A1 | 9/2011 | Rother et al. |
| 2011/0243431 | A1 | 10/2011 | Sangappa et al. |
| 2011/0273577 | A1 | 11/2011 | Saito |
| 2012/0195471 | A1 | 8/2012 | Newcombe et al. |
| 2014/0362163 | A1 | 12/2014 | Winterstein et al. |
| 2016/0352975 | A1* | 12/2016 | Kervec ................ H04N 1/6027 |
| 2017/0213112 | A1 | 7/2017 | Sachs et al. |
| 2018/0276815 | A1* | 9/2018 | Xu ........................ G06T 7/0012 |
| 2019/0205700 | A1* | 7/2019 | Gueguen .............. G06K 9/2054 |
| 2019/0340462 | A1* | 11/2019 | Pao ........................ G06T 3/4053 |
| 2020/0074642 | A1* | 3/2020 | Wilson ..................... G06T 7/174 |

FOREIGN PATENT DOCUMENTS

| | | | | |
|---|---|---|---|---|
| JP | 2010-003165 | A | | 1/2010 |
| JP | 2010003165 | A * | 1/2010 | ......... G06K 9/00228 |
| JP | 2015-041865 | A | | 3/2015 |
| JP | 2015041865 | A * | 3/2015 | ............... G06T 3/00 |
| KR | 10-2015-0010193 | A | | 1/2015 |
| KR | 20150010193 | A * | 1/2015 | |
| KR | 10-1491963 | B1 | | 2/2015 |

OTHER PUBLICATIONS

Gong, J.—"Using Depth Mapping to realize Bokeh effect with a single camera Android device"—Dec. 10, 2016, pp. 1-9 (Year: 2016).*
Lin, G.—"RefineNet: Multi-Path Refinement Networks for High-Resolution Semantic Segmentation"—arXiv—Nov. 25, 2016—pp. 1-11 (Year: 2016).*
International Search Report dated Jan. 2, 2019, issued in International Application No. PCT/KR2018/010554.
Korean Office Action dated Jun. 3, 2019, Issued in Korean Application No. 10-2018-0107401.
Korean Notice of Final Rejection dated Dec. 27, 2019, issued in Korean Patent Application No. 10-2018-0107401.

* cited by examiner

FIG. 6
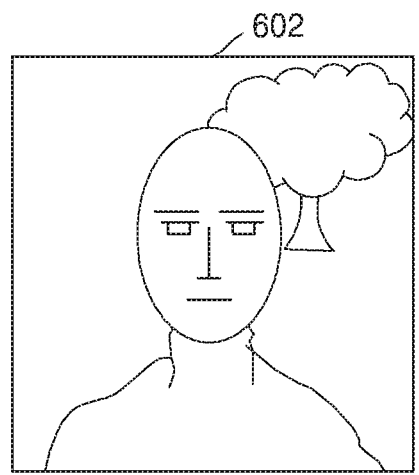
IMAGE
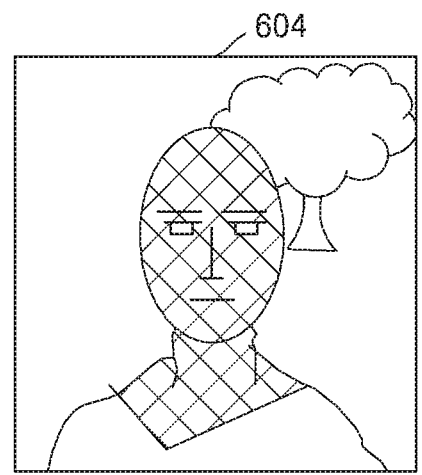
ONLY DNN BASED SEGMENTATION APPLIED
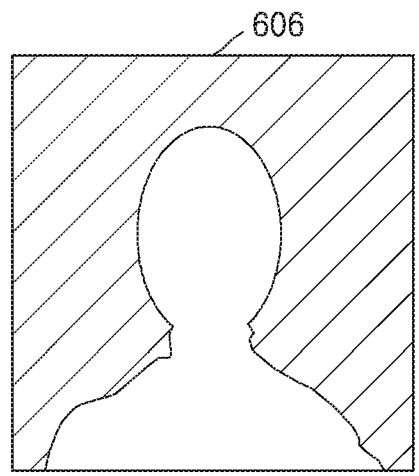
FIRST HUMAN SEGMENTATION
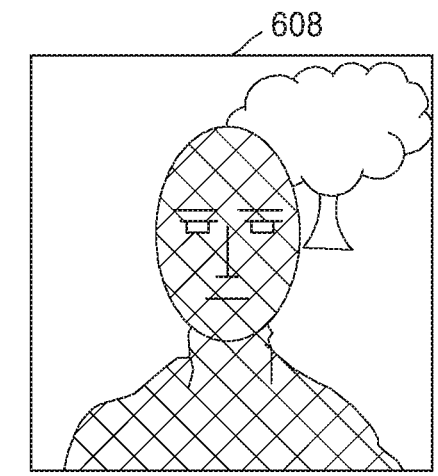
HUMAN SEGMENTATION BASED ON
BOTH FIRST HUMAN SEGMENTATION
AND SECOND HUMAN SEGMENTATION FIG. 7
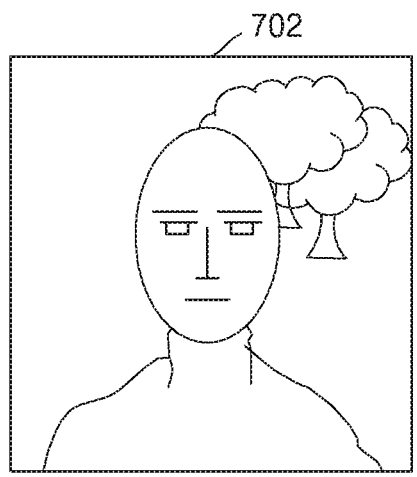
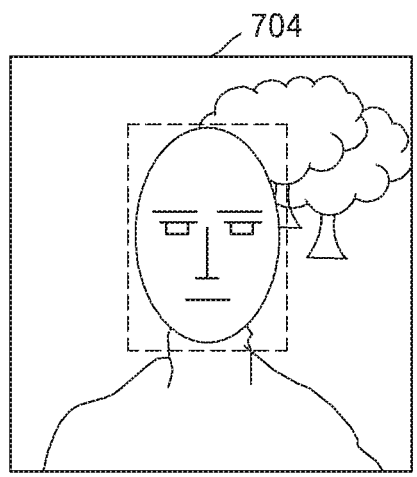
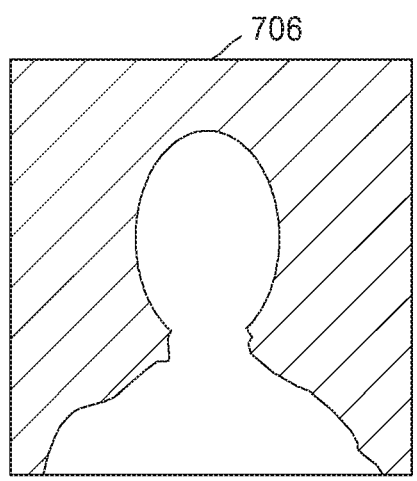
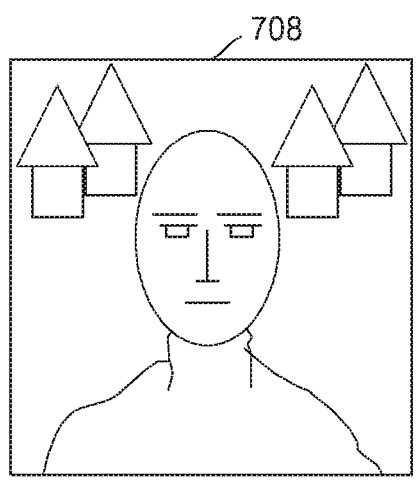

FIG. 10
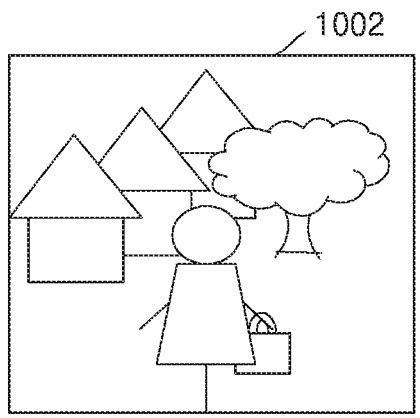
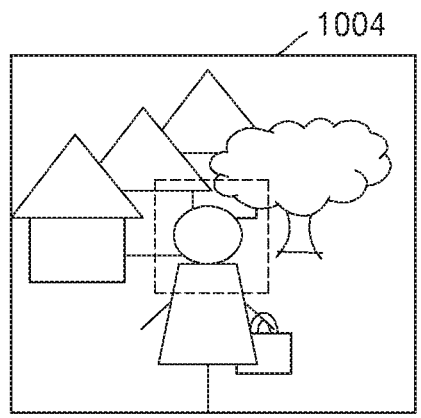
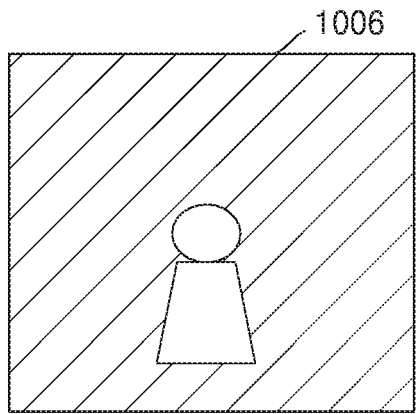
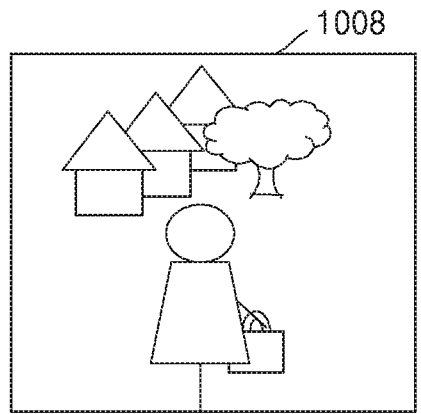

ELECTRONIC DEVICE AND METHOD FOR AUTOMATIC HUMAN SEGMENTATION IN IMAGE

CROSS-REFERENCE TO RELATED APPLICATION(S)

This application is based on and claims priority under 35 U.S.C. § 119(a) of an Indian provisional patent application number 201741031861 filed on Sep. 8, 2017, and of an Indian complete patent application number 201741031861 filed on Sep. 4, 2018, the disclosure of each of which is incorporated by reference herein in its entirety.

BACKGROUND

1. Field

The disclosure relates to a segmentation in an image. More particularly, the disclosure relates to an electronic device and method for automatic human segmentation in the image.

2. Description of Related Art

In general, an increase in use of mobile devices with camera enables users to capture a large number of images on the mobile devices. However, the images are captured by the users who may often lack necessary skills to capture good images and successfully post-process the images. Further, in many applications of post-processing the image, a subject of the image has is treated separately from a background of the image.

When the image with one or more humans is captured, the one or more humans in the image have to be segmented from the background of the image before applying any effects to aesthetically enhance the image. Many methods and systems of the related art segment the one or more humans from the image by using fixed human body templates. The fixed human body templates are applied to humans detected in the image based only on face detection. For example, if the image includes only a face of the human, the methods and systems of the related art detect the presence of the human and apply the fixed human body template. However, the methods and systems of the related art do not intelligently determine that the image includes only the face of the human and does not include the body of the human. Hence, applying the fixed human body template based only on face detection may provide inaccurate human segmentation, as shown in FIG. 1.

FIG. 1 illustrates applying a fixed template to humans in an image based only on face detection, according to the related art.

Further, a human body may be deformed i.e., the human body may have different orientations (as shown in FIG. 1), for example a tilted face. However, the fixed human body templates do not take into consideration the orientation of the human body such as the tilted face. Hence, using a fixed human body template without taking into consideration the orientation of the human body yields inaccurate human segmentation, as shown in FIG. 1.

The above information is presented as background information only to help the reader to understand the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for human segmentation in an image.

Additional aspects will be set forth in part in the description which follows and, in part, will be apparent from the description, or may be learned by practice of the presented embodiments.

In accordance with an aspect of the disclosure, a method for human segmentation in an image is provided. The method includes obtaining the image comprising at least one human, performing face detection to detect the human in the image, generating a first human segmentation from the image by comparing a pre-defined full human body template and the detected human, generating a second human segmentation from the image, by inputting the image to an artificial intelligence trained model and obtaining a composite human segmentation representing the detected human by using both of the first human segmentation and the second human segmentation.

In accordance with another aspect of the disclosure, an electronic device for human segmentation in an image is provided. The electronic device includes a display, a memory storing at least one instruction and a processor configured to execute the at least one instruction to obtain the image comprising at least one human, perform face detection to detect the human in the image, generate a first human segmentation from the image by comparing a pre-defined full human body template and the detected human, generate a second human segmentation from the image, by inputting the image to an artificial intelligence trained model and obtain a composite human segmentation representing the detected human by using both of the first human segmentation and the second human segmentation.

In accordance with another aspect of the disclosure, a non-transitory computer-readable recording medium has recorded thereon a computer program code which, when read and executed by a processor, performs a method of human segmentation in an image is provided. The method includes obtaining the image comprising at least one human, performing face detection to detect the human in the image, generating a first human segmentation from the image by comparing a pre-defined full human body template and the detected human, generating a second human segmentation from the image, by inputting the image to an artificial intelligence trained model and obtaining a composite human segmentation representing the detected human by using both of the first human segmentation and the second human segmentation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

This above and other aspects, features, and advantages of certain embodiments of the disclosure will be more apparent from the following description taken in conjunction with the accompanying drawings, in which:

FIG. 6 illustrates a comparison between the human segmentation in the image obtained using on only the deep neural network (DNN) and using both the DNN and the fixed human template, according to an embodiment of the disclosure;

FIG. 7 is an example illustration for changing a background in the image based on the human segmentation, according to an embodiment of the disclosure;

FIG. 10 is an example illustration for providing a dolly effect to the image based on the human segmentation, according to an embodiment of the disclosure;

Throughout the drawings, like reference numerals will be understood to refer to like parts, components, and structures.

DETAILED DESCRIPTION

Figure 1:
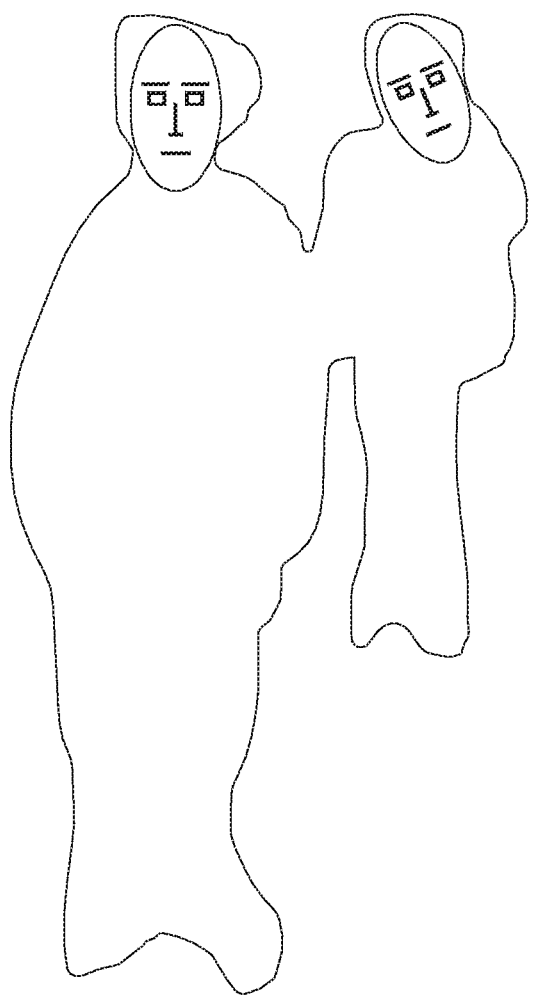
FIG. 1 illustrates applying a fixed template to humans in an image based only on face detection, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those skilled in the art will recognize that various that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for automatic human segmentation in an image by an electronic device. The method includes receiving the image and performing face detection to detect presence of one or more humans in the image.

In the embodiments herein, human segmentation and face detection are exemplarily used. However, the object to be segmented in the image are not necessarily limited to a human but may be various. Accordingly, face detection can be replaced to a detection method suitable for the object to be segmented. For example, in an embodiment, the segmentation method may provide a method of segmenting a predetermined animal in the image, and the method may include performing animal detection to detect presence of one or more predetermined animals in the image. Alternatively, in an embodiment, the segmentation method may provide a method of segmenting a predetermined object in the image, and the method may include performing object detection to detect presence of one or more predetermined objects in the image.

Further, the method includes generating a first human segmentation from the image using a pre-defined full human body template. Further, the method also includes generating a second human segmentation from the image using a deep neural network (DNN). Furthermore, the method includes automatically obtaining a composite human segmentation by fusing the first human segmentation and the second human segmentation.

In an embodiment, the pre-defined full human body template is mapped to the one or more humans detected in the image based a face data obtained from the face detection performed on the image.

In an embodiment, the first human segmentation is generated by aligning the pre-defined full human body template to the one or more humans detected in the image and refining the first human segmentation by fusing the first human segmentation and the one or more humans detected in the image.

In the methods and systems of the related art, the image with high resolution is directly passed through the DNN which takes a huge amount of time to process the image. Unlike methods and systems of the related art, in the proposed method the image with high resolution is resized before passing the image through the DNN. Therefore the time required to the image is comparatively less.

In the methods and systems of the related art, to provide the bokeh effect, two cameras have to be used to compute a distance between the human and the background, which is used to provide human segmentation and then apply the bokeh effect. Therefore, the process becomes expensive and cumbersome.

The methods and systems of the related art use only face data for segmentation of the human detected in the image. Unlike to the methods and systems of the related art, the proposed method uses the face data of the human detected in the image along with a single human body template to obtain the segmentation of the human detected in the image.

Unlike to the methods and systems of the related art, the proposed method includes generating the second human segmentation using the DNN, which is combined with the first human segmentation to segment the human in the image.

Unlike to the methods and systems of the related art, the proposed method includes using a single monocular image to automatically segment the human in the single monocular image.

The methods and systems of the related art, do not intelligently determine the presence of humans in the image. For example, consider that the image includes only the face of the human and the not the body of the human. However, the fixed human body template of a full human body is directly applied based on face detection without taking into consideration the absence of the body of the human in the image. Unlike to the methods and systems of the related art, the proposed method includes intelligently determining the human in the image and then applying the fixed human body template. Therefore, the proposed method provides better accuracy in segmenting the human as compared to the existing methods.

Referring now to the drawings, and more particularly to FIGS. 2 through 14, where similar reference characters denote corresponding features consistently throughout the figures, there are shown preferred embodiments.

Figure 2:
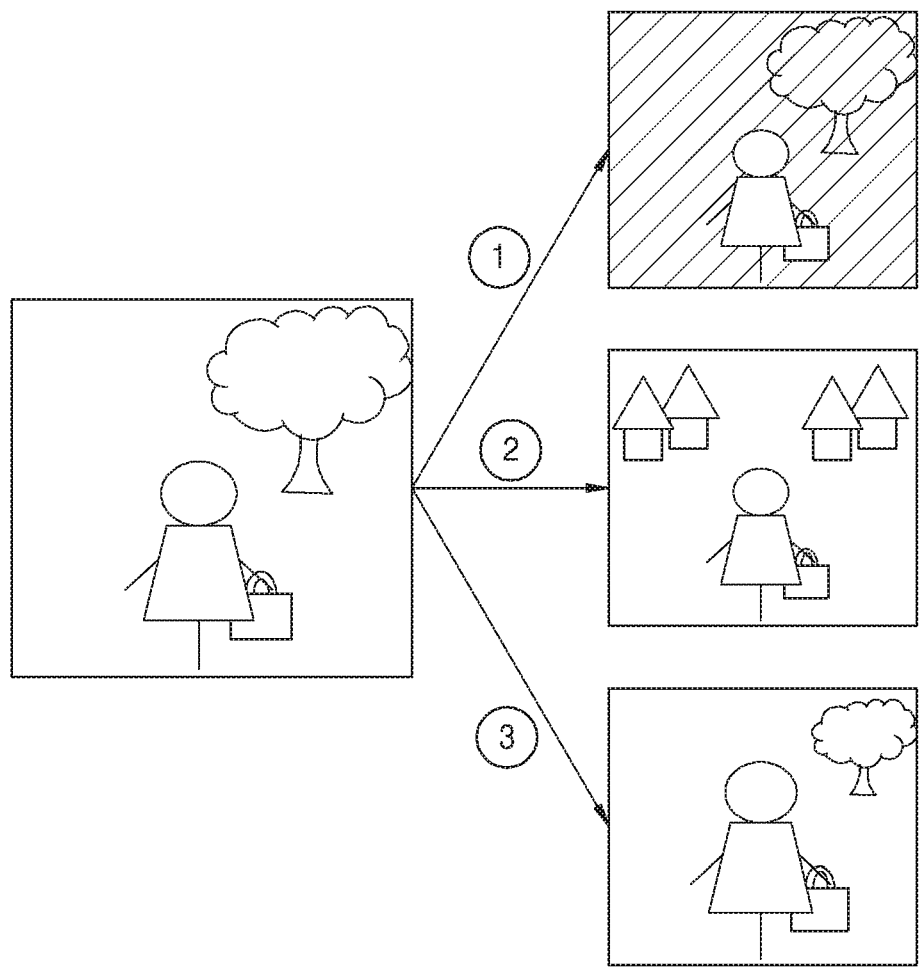
FIG. 2 illustrates various effects that can be applied to the image based on a human segmentation, according to an embodiment as of the disclosure.

FIG. 2 illustrates various effects that can be applied to the image based on the human segmentation, according to an embodiment of the disclosure.

Figure 3A:
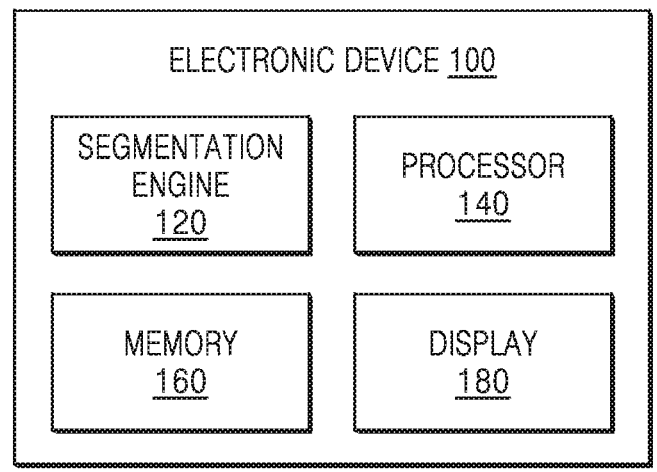
FIG. 3A is a block diagram illustrating various hardware elements of an electronic device for providing the human segmentation in the image, according to an embodiment of the disclosure.

Referring to the FIG. 2, consider the electronic device 100 (as shown in FIG. 3A) receives the image. For example, the electronic device 100 may obtain the image using camera comprised in the electronic device 100. Or, the electronic device 100 may receive the image from external device or server connected with network. But the image obtaining method of the electronic device 100 is not limited thereto. Consider the image includes the presence of the human. The primary focus of the image is the human in the image. However, there can be multiple objects in the background and in proximity to the human in the image. Since, the primary focus of the image is the human, the human has to be segmented from the multiple objects in the background. Further, once the human in the image is segmented from the multiple objects in the background and proximity to the human, then various effects can be applied to the image to enhance aesthetic quality of the image.

For example, after segmenting the human in the image, the bokeh effect can be applied to the image (as shown in operation 1) by blurring the background of the human in the image. In an embodiment, the blurring may be performed by averaging pixel values located in the area to be blurred. Or, the blurring may include motion blur method provided in a predetermined direction. However, the blurring method of the disclosure is not limited thereto.

In another example, after segmenting the human in the image, the objects in the background of the image, the background color, etc. can be changed (as shown in operation 2). In an embodiment, the objects in the background of the image, the background color, etc. may be changed based on the background change signal input from the user. The electronic device 100 may provide the user a plurality of predetermined backgrounds or predetermined effects to be provided, and may change the background of the image based on the selection signal received from the user.

In yet another example, after segmenting the human in the image, a dolly effect can be applied to the image (as shown in operation 3), where the human in the image is retained at the same size whereas the size of the multiple objects in the background is changed.

FIG. 3A is a block diagram illustrating various hardware elements of the electronic device 100 for providing the human segmentation in the image, according to an embodiment of the disclosure.

In an embodiment, the electronic device 100 can be, for example, a mobile phone, a smart phone, personal digital assistants (PDAs), a tablet, a wearable device, display devices, internet of things (IoT) devices, electronic circuit, chipset, and electrical circuit (i.e., system on chip (SoC)), etc.

Referring to the FIG. 3A, the electronic device 100 includes a segmentation engine 120, a processor 140, a memory 160 and a display 180.

In an embodiment, the segmentation engine 120 is configured to detect the presence of the one or more humans in the image by performing face detection. The image may be one of the image stored in the electronic device 100, the image received by the electronic device 100 and the live preview image from a camera application of the electronic device 100.

Further, the segmentation engine 120 is also configured to generate the first human segmentation by mapping the pre-defined full human body template to the one or more humans detected in the image. In an embodiment, the full human body template may be a template containing information about the shape of a full-body of a human. A template may be predetermined information which is an index that can identify a part of an image. In an embodiment, the full human body template may include a line representing the outline of the shape of the full-body of the human. Alternatively, the full human body template may include a 2-dimensional area including an area representing the shape of the full-body of the human.

The pre-defined full human body template may be a single template that is stored in the electronic device 100 and may be used for mapping to the one or more humans detected in the image. Further, the segmentation engine 120 is also configured to generate the second human segmentation from the image using the artificial intelligence (AI)-trained model, exemplarily DNN, and obtain the composite human segmentation in the image by fusing the first human segmentation and the second human segmentation.

When the image is the live preview image, then the segmentation engine 120 is configured to obtain the composite human segmentation in the image by fusing the first human segmentation with the blurred version of the image itself. Furthermore, the segmentation engine 120 is configured to apply various effects such as the bokeh effect in the image based on the human segmentation.

In an embodiment, the processor 140 can be configured to interact with the hardware elements such as the segmentation engine 120, the memory 160 and the display 180 for providing human segmentation in the image.

In an embodiment, the memory 160 is configured to store the images comprising the one or more humans. The memory 160 is also configured to store the pre-defined full human body template which is used for generating the first human segmentation. The memory 160 can include non-volatile storage elements. Examples of such non-volatile storage elements may include magnetic hard discs, optical discs, floppy discs, flash memories, or forms of electrically programmable read only memories (EPROM) or electrically erasable and programmable (EEPROM) read only memories. In addition, the memory 160 may, in some examples, be considered a non-transitory storage medium. The term "non-transitory" may indicate that the storage medium is not embodied in a carrier wave or a propagated signal. However, the term "non-transitory" should not be interpreted that the memory 160 is non-movable. In some examples, the memory 160 can be configured to store larger amounts of information than the memory. In certain examples, a non-transitory storage medium may store data that can, over time, change (e.g., in random access memory (RAM) or cache).

In an embodiment, the display 180 can be configured to display the image with the composite human segmentation. Further, the display 180 is also configured to display the image with the bokeh effect. Further, the display 180 is also configured to provide the live preview of the image which includes the one or more humans.

Although the FIG. 3A shows the hardware elements of the electronic device 100 but it is to be understood that other embodiments are not limited thereon. In other embodiments, the electronic device 100 may include less or more elements. Further, the labels or names of the elements are used only for illustrative purpose and does not limit the scope of the disclosure. One or more components can be combined together to perform same or substantially similar function for providing human segmentation in the image. For example, the processor 140 and the segmentation engine 120 are described as being separate devices, but they are not limited thereto. For example, the functions of the processor 140 and the segmentation engine 120 may be implemented by a single processor. Or, the segmentation engine 120 may also be implemented by a software program stored in memory.

Figure 3B:
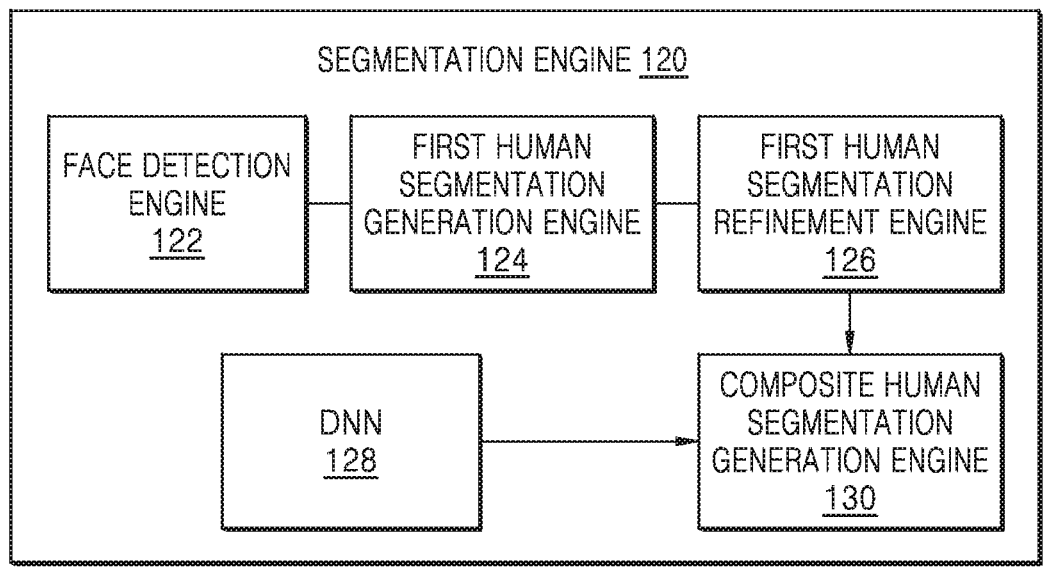
FIG. 3B is a block diagram illustrating various hardware elements of a segmentation engine, according to an embodiment of the disclosure.

FIG. 3B is a block diagram illustrating various hardware elements of the segmentation engine 120, according to an embodiment of the disclosure.

Referring to the FIG. 3B, the segmentation engine 120 includes a face detection engine 122, a first human segmentation generation engine 124, a first human segmentation refinement engine 126, a DNN 128 and a composite human segmentation generation engine 130.

In an embodiment, the face detection engine 122 can be configured to perform the face detection to detect the presence of the one or more humans in the image. The face detection engine 122 may perform face detection using various algorithms. Further, the face detection engine 122 is also configured to generate face data based on the face detection. The face data may be data related to the faces of humans detected in the image, which are generated based on face detection and the image.

The first human segmentation generation engine 124 configured to generate the first human segmentation based on the face detection and a pre-defined full human body template. The human segmentation may be information which is an index that can identify the human shape in the image. In an embodiment, the human segmentation may include information indicating an outline of the human shape. Alternatively, the human separation may include information about an area representing a human shape. Alternatively, the human separation may include information about the shape of the human and the area in which the shape of the human in the associated frame moves.

In an embodiment, the first human segmentation generation engine 124 can be configured to determine a template coefficient based on the face detection using information such as a face position, a face size and a visibility (face body in field of view) and a color propagation (color similarity). In an embodiment, the template coefficients may be determined by comparing the information based on the face detection and the pre-defined full human body template. Furthermore, the first human segmentation generation engine 124 is configured to map the pre-defined full human body template to the one or more humans detected in the image by aligning the pre-defined full human body template to the one or more humans based on the face detection. For example, the first human segmentation generation engine 124 may adjust a size, direction, or position within an image of the pre-defined full human body template based on the determined template coefficients and the pre-defined full human body template. In an embodiment, when the detected person in the image contains only a portion of the human body, the first human segmentation generation engine 124 may use only a portion of the adjusted pre-defined full human body template. The first human segmentation generation engine 124 may obtain a first human segmentation based on the adjusted pre-defined full human body template and image.

The first human segmentation refinement engine 126 configured to refine the first human segmentation based on the image. In an embodiment, the first human segmentation refinement engine 126 can be configured to perform multi-level color similarity based correction. For example, the first human segmentation refinement engine 126 may adjust the border or area of the first human segmentation based on the multilevel color similarity based correction. Further, the first human segmentation refinement engine 126 can also be configured to perform boundary refinement to further refine the first human segmentation. For example, the first human segmentation refinement engine 126 may adjust border of the first human segmentation generated by the first human segmentation generation engine 124 so that the boundary of the first human segmentation to be closer to the boundary of the detected human shape in the image by performing the boundary refinement.

In an embodiment, the DNN 128 is configured to generate the second human segmentation from the image based on the training data. The image is resized to a lower resolution and then passed through the DNN 128 to obtain the second human segmentation from the image. Further, the second human segmentation provided by the DNN 128 also has low resolution as compared to the image. However, the second human segmentation obtaining method is not limited to the DNN. The artificial intelligence trained model for obtaining the second human segmentation is not limited thereto. The DNN 128 may be, for example, replaced by one of a machine learning, neural network, deep learning, classification algorithm, recurrent neural network (RNN), or a bidirectional recurrent deep neural network (BRDNN), but an embodiment is not limited thereto.

In an embodiment, the composite human segmentation generation engine 130 can be configured to obtain the human segmentation in the image by mapping the first human segmentation to the second human segmentation obtained from the DNN 128. Further, in case of the live preview image, the composite human segmentation generation engine 130 can be configured to obtain the human segmentation in the image by fusing the first human segmentation and the image.

Figure 4:
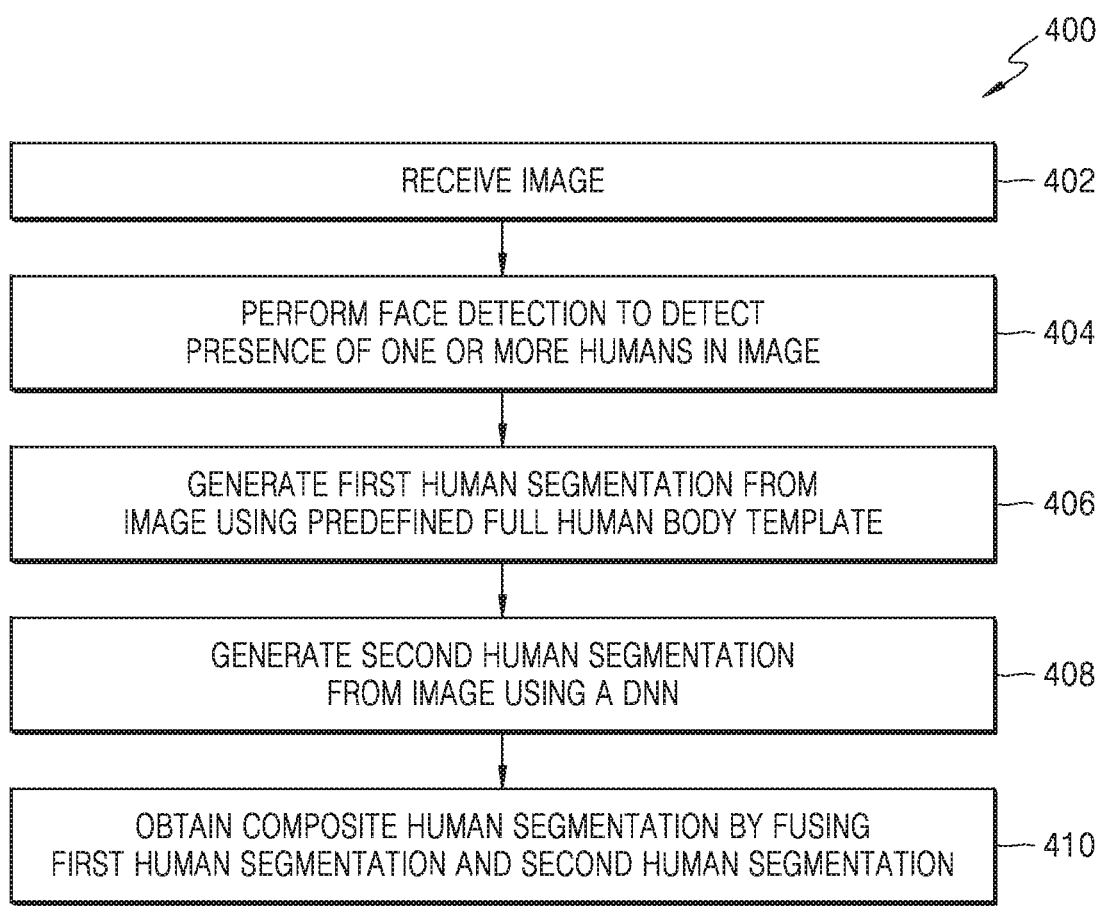
FIG. 4 is a flow chart illustrating a method for providing the human segmentation in the image using a first human segmentation and a second human segmentation, according to an embodiment of the disclosure.

FIG. 4 is a flow chart 400 illustrating a method for providing the human segmentation in the image using the first human segmentation and the second human segmentation, according to an embodiment of the disclosure.

Referring to the FIG. 4, at operation 402, the electronic device 100 receives the image. For example, in the electronic device 100 as illustrated in the FIG. 3A, the segmentation engine 120 can be configured to receive the image.

At operation 404, the electronic device 100 performs the face detection to detect the presence of the one or more humans in the image. For example, in the electronic device 100 as illustrated in the FIG. 3A, the segmentation engine 120 can be configured to perform the face detection to detect the presence of the one or more humans in the image.

At operation 406, the electronic device 100 generates the first human segmentation from the image using the pre-defined full human body template. For example, in the electronic device 100 as illustrated in the FIG. 3A, the segmentation engine 120 can be configured to generate the first human segmentation from the image using the pre-defined full human body template.

At operation 408, the electronic device 100 generates the second human segmentation from the image using the artificial intelligence trained model, exemplarily DNN 128. For example, in the electronic device 100 as illustrated in the FIG. 3A, the segmentation engine 120 can be configured to generate the second human segmentation from the image using the DNN 128.

At operation 410, the electronic device 100 obtains the composite human segmentation by fusing the first human segmentation and the second human segmentation. For example, in the electronic device 100 as illustrated in the FIG. 3A, the segmentation engine 120 can be configured to obtain the composite human segmentation by fusing the first human segmentation and the second human segmentation.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 5:
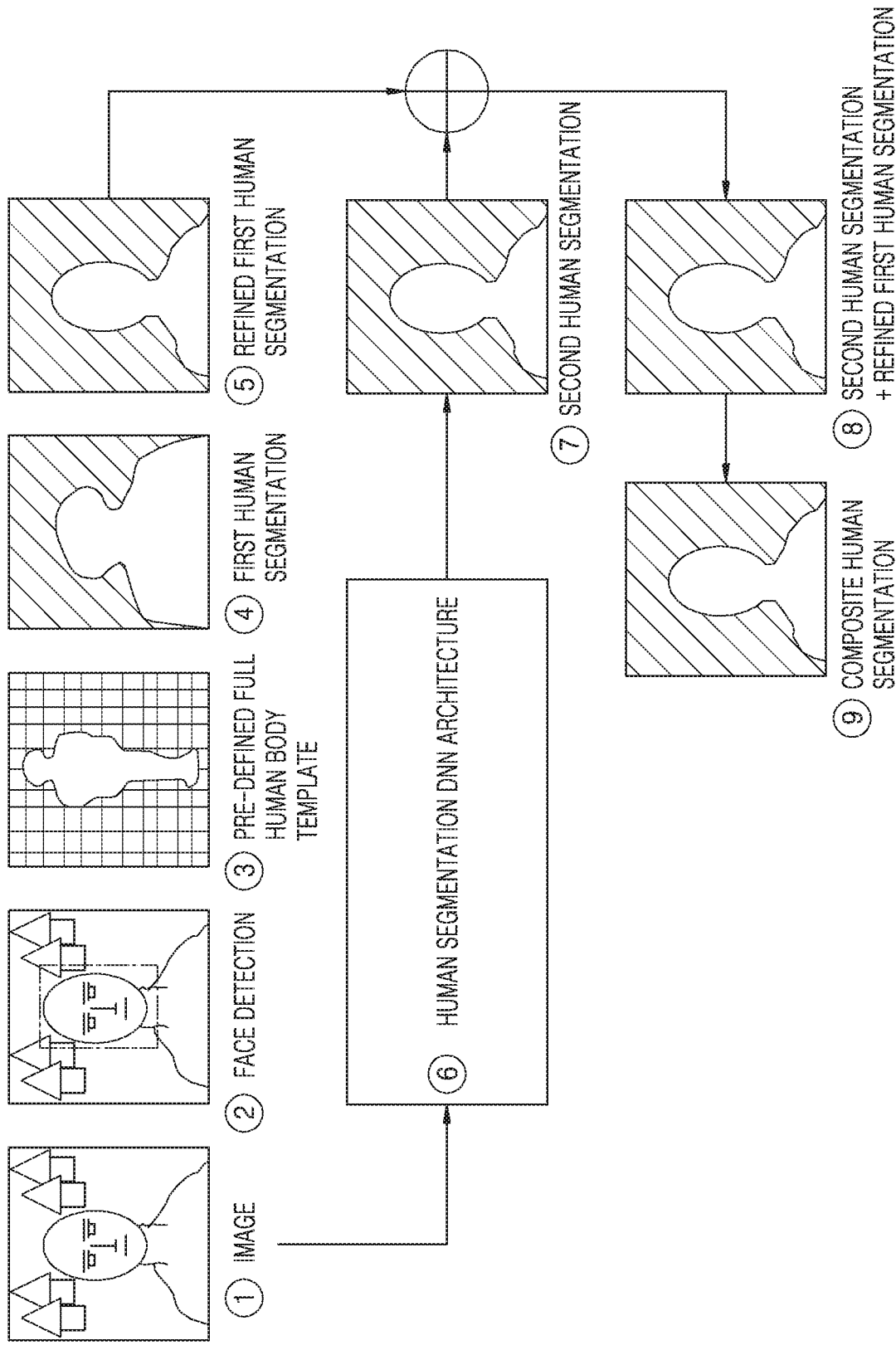
FIG. 5 illustrates a method for providing the human segmentation in the image based on the first human segmentation and the second human segmentation, according to an embodiment of the disclosure.

FIG. 5 illustrates the method for providing the human segmentation in the image based on the first human segmentation and the second human segmentation, according to an embodiment of the disclosure. For example, the electronic device 100 may obtain the image using camera comprised in the electronic device 100. Or, the electronic device 100 may receive the image from external device or server connected with network. But the image obtaining method of the electronic device 100 is not limited thereto.

Referring to the FIG. 5, at operation 1, consider the electronic device 100 receives the image containing the human. The image is already captured and stored in the electronic device 100.

At operation 2, the face detection engine 122 performs the face detection to determine the humans in the image.

Further, at operation 3, the first human segmentation generation engine 124 configured to generate the first human segmentation. The human segmentation may be information which is an index that can identify the human shape in the image. In an embodiment, the human segmentation may include information indicating an outline of the human shape. Alternatively, the human separation may include information about an area representing a human shape. Alternatively, the human separation may include information about the shape of the human and the area in which the shape of the human in the associated frame moves.

The first human segmentation generation engine 124 may map the pre-defined full human body template to the human detected in the image based on the face data.

In an embodiment, the first human segmentation generation engine 124 can be configured to determine a template coefficient based on the face detection using information such as a face position, a face size and a visibility (face body in field of view) and a color propagation (color similarity). In an embodiment, the template coefficients may be determined by comparing the information based on the face detection and the pre-defined full human body template. Furthermore, the first human segmentation generation engine 124 is configured to map the pre-defined full human body template to the one or more humans detected in the image by aligning the pre-defined full human body template to the one or more humans based on the face detection. For example, the first human segmentation generation engine 124 may adjust a size, direction, or position within an image of the pre-defined full human body template based on the determined template coefficients and the pre-defined full human body template. In an embodiment, when the detected person in the image contains only a portion of the human body, the first human segmentation generation engine 124 may use only a portion of the adjusted pre-defined full human body template. The first human segmentation generation engine 124 may obtain a first human segmentation based on the adjusted pre-defined full human body template and image.

Further, the first human segmentation generation engine 124 generates the first human segmentation based on the mapping of the pre-defined full human body template to the human detected in the image. The mapped first human segmentation for the human detected in the image at operation 1 is as shown in operation 4.

At operation 5, the electronic device 100 performs multi level color similarity based template boundary refinement for the mapped first human segmentation to obtain the final first human segmentation which matches perfectly with human determined in the image. Further, the multi level color similarity based template boundary refinement runs in parallel for several image frames in case of a video.

Further, parallelly at operation 6, the image containing the human in passed may input to the artificial intelligence trained model, and the artificial intelligence trained model may generate the second human segmentation from the input image. For example, the trained DNN 128 may be configured to generate the second human segmentation from the image. The second human segmentation (as shown in operation 7) generated by the DNN 128 has a low resolution when compared with the image at operation 1.

At operation 8, the first human segmentation generated at operation 5 and the second human segmentation generated at operation 7 are combined together to obtain the composite human segmentation in the image, as shown in operation 9. After the human in the image is segmented, various effects can be added to the image such as bokeh effect, dolly effect, adding or removing the background objects, changing the background, adding graphics etc.

FIG. 6 illustrates a comparison between the human segmentation in the image using on only the DNN 128 and using both the DNN 128 and the fixed human template, according to an embodiment of the disclosure.

Referring to the FIG. 6, at operation 602, consider the image which includes the human. The face detection is performed on the image to detect the presence of human in the image.

At operation 604, the segmented human body is generated from the image using only the DNN 128. However, the output of the DNN 128 is data dependent and depends on the training data used to train the DNN 128. Therefore, generating the segmented human body completely based on the DNN 128 is prone to errors as shown in operation 604. Further, errors are observed in segmentation at the shoulder of the human detected in the image.

Furthermore, if the human detected in the image is present in various pose, gesture and posture then the template generated will have errors. For example, if the human is waving in the image, then the DNN 128 will not be able to segment the hand of the human with which the human is waving.

Also, due to the complexity of the DNN 128 the image cannot be used in the original resolution. For example, a 12 MP image is resized to 320×240 to compute the human segmentation in the DNN 128. Further, to generate the second human segmentation the output of the DNN 128 is upsized back to 12 MP which results in errors in boundary segmentation of the image.

Therefore, in the proposed method, the output of the DNN 128 is combined with the first human segmentation (shown in operation 606). The first human segmentation is generated using the pre-defined full human body template stored in the electronic device 100. Further, the human segmentation in the image is obtained by fusing the first human segmentation and the output from the artificial intelligence trained model i.e., the second human segmentation, as shown at operation 608. Therefore, the composite human segmentation generated by combining the first human segmentation and the second human segmentation provides high accuracy in segmenting the human in the image with accurate boundary segmentation. Further, the composite human segmentation generated by combining the first human segmentation and the second human segmentation also has the original resolution as that of the image at operation 602.

FIG. 7 is an example illustration for changing the background in the image based on the human segmentation, according to an embodiment of the disclosure.

Referring to the FIG. 7, consider the image containing the human with objects such as tress in the background of the human in the image, as shown in operation 702. At operation 704, the electronic device 100 performs the face detection to determine the human in the image. Further, the electronic device 100 generates the first human segmentation using the image by mapping the pre-defined full human body template to the human detected in the image as shown in operation 706. Further, the electronic device 100 generates the second human segmentation from the image using the artificial intelligence trained model, exemplarily DNN 128, and combines the first human segmentation and the second human segmentation to obtain the composite human segmentation in the image.

In another embodiment, the image can be the live preview of the camera application, containing the human in the image. In such a scenario, the electronic device 100 generates the segmented human body from the image by fusing the first human segmentation and the image. Furthermore, the electronic device 100 provides the composite human segmentation in the image based on the segmented human body.

At operation 708, after the composite human segmentation is obtained in the image, the electronic device 100 changes the background of the image. The background of the image is changed to a residential locality, as shown in operation 708. Further, after the composite human segmentation is obtained in the image, the existing background can also be modified by changing illumination, applying various color filters, and the like. Furthermore, the background can be changed to provide 3D objects and effects, GIF, etc. can be added to the background.)

). In an embodiment, the objects in the background of the image, the background color, etc. may be changed based on the background change signal input from the user. The electronic device 100 may provide the user a plurality of predetermined backgrounds or predetermined effects to be provided, and may change the background of the image based on the selection signal received from the user.

In an embodiment, if the live preview is a sequence of a plurality of images, the electronic device 100 may select at least one image to perform the above-described process. The composite human segmentation operation and the image background change operation for the selected images can be operated to each of the images in parallel. For example, the electronic device 100 may obtain composite human segmentation for the images which is a key frame of the sequence, and may change the background of the image based thereon.

Therefore, the proposed method allows the user of the electronic device 100 to change the background of the image even in the live preview before the image is captured by the electronic device 100.

Figure 8:
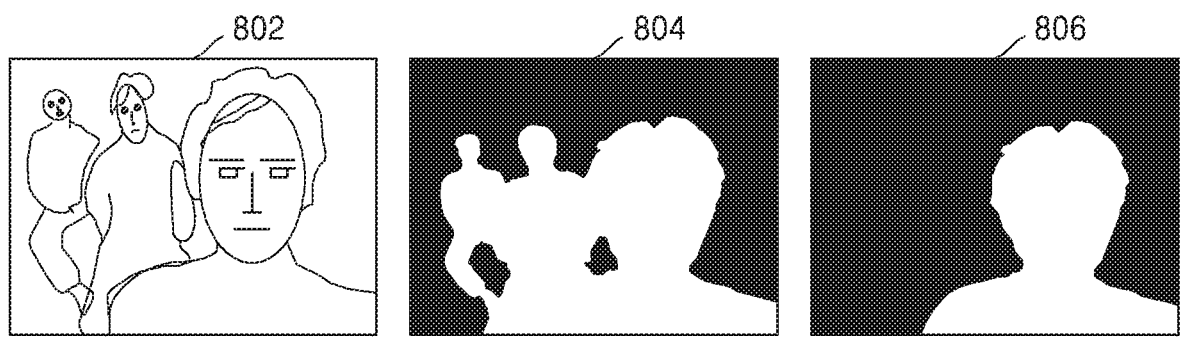
FIG. 8 is an example illustration for providing the human segmentation with a structured light depth, according to an embodiment of the disclosure.

FIG. 8 is an example illustration for providing the human segmentation with a structured light depth, according to an embodiment of the disclosure.

Consider an image with multiple humans located at various depths. Referring to the FIG. 8, at operation 802, the electronic device 100 receives the image and performs the face detection of each of the multiple humans present in the image. The image can also be the live preview image which is obtained by the camera application of the electronic device 100.

Further, at operation 804, a structured light data associated with the multiple humans in the image is combined with the human segmentation to obtain the estimation of the depth of each of the multiple humans in the image. Further, based on the estimation of the depth of each of the multiple humans in the image, each human in the image are segmented separately. The combination of the structured light data associated with the multiple humans in the image with the human segmentation provides information of the human located in the foreground and the humans located in the background of the image. Or, humans in the image may be grouped into a plurality of group with similar depths based on the estimation of the depth.

At operation 806, the human in the foreground is segmented based on the structured light. After the human in the foreground of the image is segmented, various effects can be applied to the image such as selectively focusing on the human in the foreground, dolly effect, inserting absentee humans, and the like.

Further, more than one human can be considered as part of the foreground and the other portion of the image apart from the more than one human in the foreground may be blurred or render unclear the humans in the background or one or more portions of the image other than the more than one human in the foreground, or combinations thereof based on the human segmentation.

Figure 9:
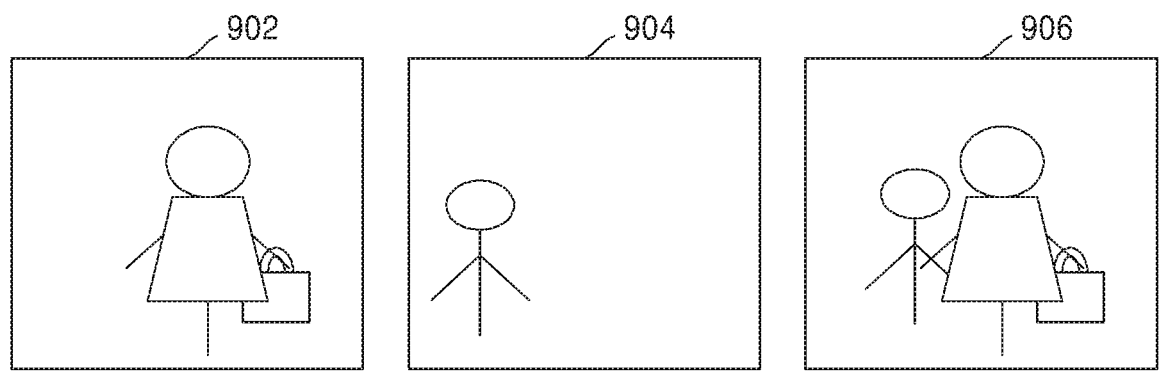
FIG. 9 is an example illustration for inserting a human from a second image into a first image based on the human segmentation, according to an embodiment of the disclosure.

FIG. 9 is an example illustration for inserting the human from a second image into a first image based on the human segmentation, according to an embodiment of the disclosure.

Referring to the FIG. 9, at operation 902, the first image is received by the electronic device 100 and the human in the first image is detected by performing the face detection. Further, the human is the first image is segmented based on the first human segmentation and the second human segmentation determined using the DNN 128.

At operation 904, the second image is received by the electronic device 100 and the human in the second image is detected by performing the face detection. Further, the human is the second image is segmented based on the first human segmentation and the second human segmentation determined using the DNN 128.

At operation 906, the human segmented in the second image is inserted into the first image (i.e., the human in the second image is overlaid on to the first image). The first image now contains the human segmented in the first image and the human segmented in the second image. Therefore, the human segmented in the second image which was absent in the first image is inserted into the first image based on the human segmentation. Although the insertion of the human from the second image into the first image based on human segmentation operation of the system has been explained with respect to two images, the electronic device 100 can typically be configured to process a sequence of images. In an embodiment, the relative position in the first image of the human separated from the second image may be determined based on the estimation of the depth. Also, the relative position and size in the first image of the human separated from the second image may be determined based on the input signal from the user received via an input unit (not shown).

Similarly, any graphical objects such as a 3D watermark, clipart, text can also be inserted into the image, after segmenting the one or more humans in the image.

FIG. 10 is an example illustration for providing the dolly effect to the image based on the human segmentation, according to an embodiment of the disclosure.

Referring to the FIG. 10, at the operation 1002, the electronic device 100 receives the image. At operation 1004, the electronic device 100 performs face detection on the human in the image and obtains the face data and the face landmarks. At operation 1006, the human in the image is segmented based the human segmentation performed using the first human segmentation and the second human segmentation obtained from the DNN 128 on the image.

At operation 1008, after the electronic device 100 has performed the human segmentation, the dolly effect is applied to the image where the human in the image is retained at the same size as in operation 1002 and the size of the background of the image is changed relative to the human in the image.

Further, the dolly effect can also be applied to the live preview image of the camera application of the electronic device 100.

Hence, after segmenting the human in the image, various image effects can be applied to the image such as dolly effect, bokeh effect, re-lighting of the human in the image, and the like. Therefore, the proposed method provides the automatic human segmentation by the electronic device 100 which allows the user to obtain images with enhanced effects based on human segmentation.

Figure 11:
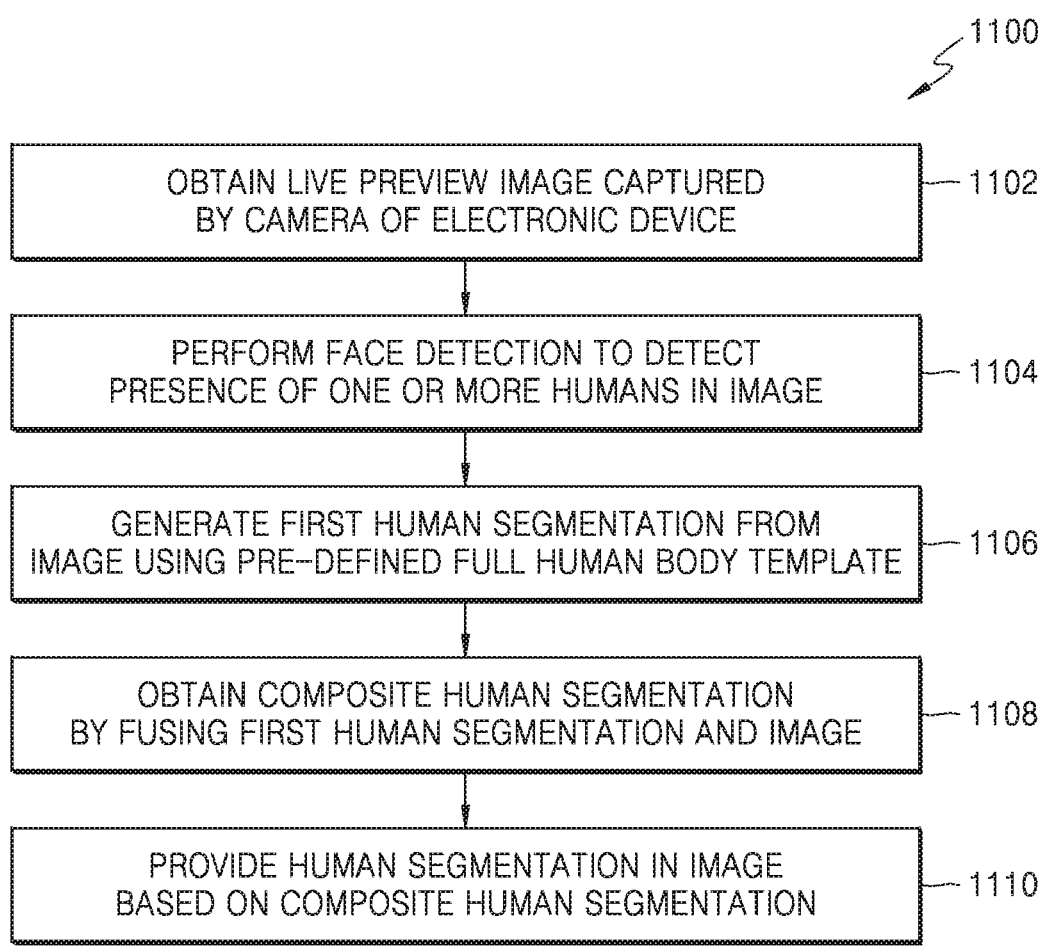
FIG. 11 is a flow chart illustrating a method for providing the human segmentation in a live preview image, according to an embodiment of the disclosure.

FIG. 11 is a flow chart 1100 illustrating a method for providing the human segmentation in the live preview image, according to an embodiment of the disclosure.

Referring to the FIG. 11, at operation 1102, the electronic device 100 obtains the live preview image (image) captured by the camera. For example, in the electronic device 100 as illustrated in the FIG. 3A, the segmentation engine 120 can be configured to obtain the live preview image captured by the camera.

At operation 1104, the electronic device 100 performs the face detection to detect the presence of the one or more humans in the image. For example, in the electronic device 100 as illustrated in the FIG. 3A, the segmentation engine 120 can be configured to perform the face detection to detect the presence of the one or more humans in the image.

At operation 1106, the electronic device 100 generates the first human segmentation from the image using the pre-defined full human body template. For example, in the electronic device 100 as illustrated in the FIG. 3A, the segmentation engine 120 can be configured to generate the first human segmentation from the image using the pre-defined full human body template.

At operation 1108, the electronic device 100 obtains the composite human segmentation by fusing the first human segmentation and the image. For example, in the electronic device 100 as illustrated in the FIG. 3A, the segmentation engine 120 can be configured to obtain the composite human segmentation by fusing the first human segmentation and the image.

At operation 1110, the electronic device 100 provides the human segmentation in the image based on the composite human segmentation. For example, in the electronic device 100 as illustrated in the FIG. 3A, the segmentation engine 120 can be configured to provide the human segmentation in the image based on the composite human segmentation.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 12:
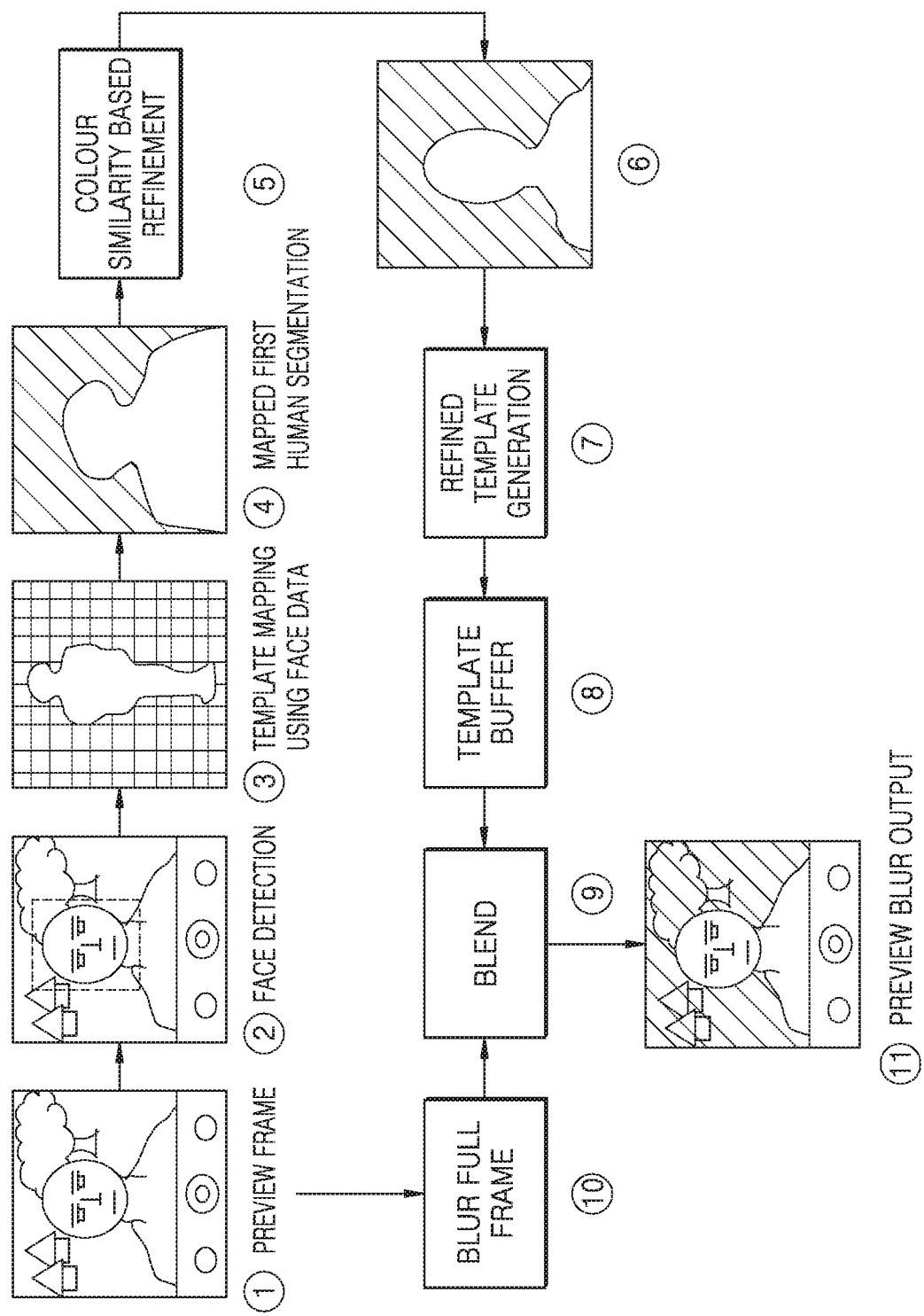
FIG. 12 illustrates a method of providing a bokeh effect in the live preview image captured by a camera of the electronic device, according to an embodiment of the disclosure.

FIG. 12 illustrates a method of providing the bokeh effect in the live preview image captured by the camera of the electronic device 100, according to an embodiment of the disclosure.

Referring to the FIG. 12, at operation 1, consider the image containing the human in the live preview of the camera application of the electronic device 100.

At operation 2, the face detection engine 122 performs the face detection to determine the humans in the image in the live preview of the camera application. Further, at operation 3, the first human segmentation generation engine 124 maps the pre-defined full human body template to the human detected in the image based on the face data and generates the first human segmentation. The mapped first human segmentation for the human detected in the image at operation 1 is as shown in operation 4.

At operation 5, the electronic device 100 performs multi level color similarity based template boundary refinement for the mapped first human segmentation to obtain the first human segmentation which matches perfectly with human determined in the image. The first human segmentation after performing the multi level color similarity based template boundary refinement is as shown in operation 6. Further, the multi level color similarity based template boundary refinement runs in parallel for several image frames in case of a video at operation 7. The first human segmentation is further subjected to refinement to generate the final first human segmentation, which is passed through a template buffer at operation 8.

Further, parallelly at operation 9, the image containing the human in the live preview of the camera application is completely blurred. At operation 10, the blurred image containing the human in the live preview and the final first human segmentation are blended to obtain the bokeh effect in the live preview of the camera application, as shown in operation 11.

Figure 13:
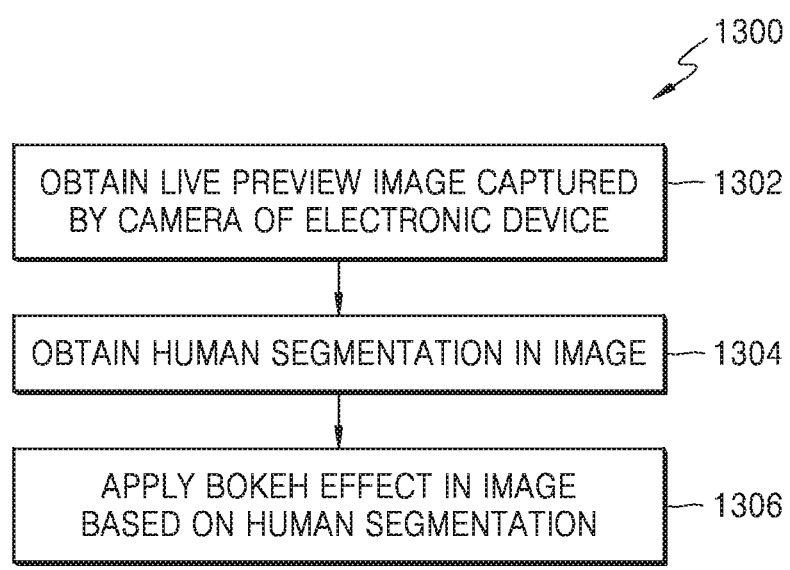
FIG. 13 is a flow chart illustrating a method for applying the bokeh effect in the image based on the human segmentation, according to an embodiment of the disclosure.

FIG. 13 is a flow chart 1300 illustrating a method for applying the bokeh effect in the image based on the human segmentation, according to an embodiment of the disclosure.

Referring to the FIG. 13, at operation 1302, the electronic device 100 obtains the live preview image (image) captured by the camera application. For example, in the electronic device 100 as illustrated in the FIG. 3A, the segmentation engine 120 can be configured to obtain the live preview image captured by the camera application.

At operation 1304, the electronic device 100 obtains the human segmentation in the image. For example, in the electronic device 100 as illustrated in the FIG. 3A, the segmentation engine 120 can be configured to obtain the human segmentation in the image.

At operation 1306, the electronic device 100 applies the bokeh effect in the image based on the human segmentation. For example, in the electronic device 100 as illustrated in the FIG. 3A, the segmentation engine 120 can be configured to apply the bokeh effect in the image based on the human segmentation.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 14:
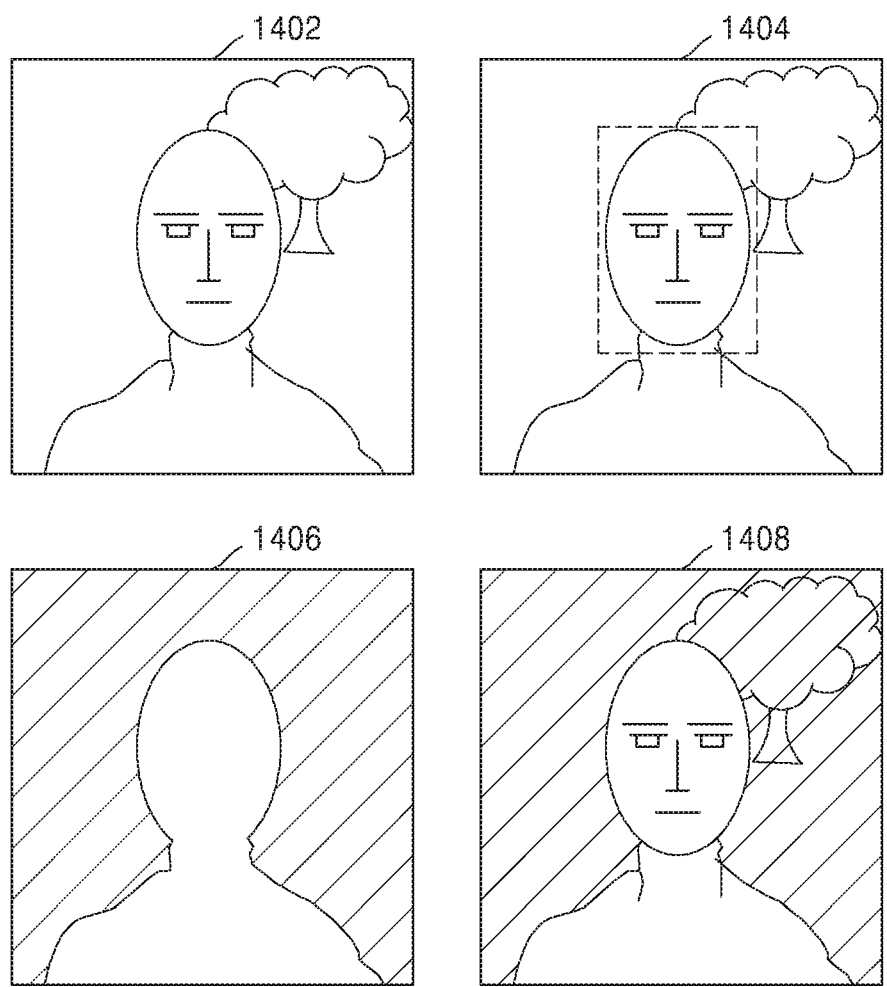
FIG. 14 is an example illustration for providing the bokeh effect to the image based on the human segmentation, according to an embodiment of the disclosure.

FIG. 14 is an example illustration for providing the bokeh effect to the image based on the human segmentation, according to an embodiment of the disclosure.

In photography, the bokeh or blurring effect is provided using an effect of a depth of field to blur the background and/or foreground of the image that does not include the main subject (the segmented human in the proposed method), which is in focus.

Referring to the FIG. 14, at operation 1402, consider the image which is the live preview containing the human in the camera application of the electronic device 100. At operation 1404, the electronic device 100 performs face detection to determine the human in the image. Further, the electronic device 100 generates the first human segmentation by mapping the pre-defined full human body template to the human detected in image as shown in operation 1406.

Further, the electronic device 100 generates the segmented human body from the image by fusing the first human segmentation and the image. Furthermore, the electronic device 100 provides the composite human segmentation in the image based on the segmented human body.

In another embodiment, the image can be any image captured and stored in the electronic device 100. In such a scenario, electronic device 100 generates second human segmentation from the image using the artificial intelligence trained model, exemplarily DNN 128, and fuses the first human segmentation and the second human segmentation to obtain the composite human segmentation in the image.

At operation 1408, the human in the image is segmented, the electronic device 100 applies the bokeh effect to the image. The bokeh effect can be used in combination with for example various blur patterns such as field blur, iris blur and tilt-shift blur. Further, the blur patterns may be used in combinations of two or more blur patterns.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for human segmentation in an image by an electronic device, the method comprising:
    obtaining the image comprising a human;
    performing face detection to detect the human in the image;
    generating a first human segmentation, without using a machine learning algorithm or neural network model, from the image by comparing a pre-defined full human body template and the detected human;
    generating a second human segmentation from the image by inputting the image to an artificial intelligence trained model;

obtaining a composite human segmentation representing the detected human by using both of the first human segmentation and the second human segmentation; and applying a bokeh effect in the image based on the composite human segmentation by:
   blurring the image, and
   blending the blurred image and information about the human obtained based on the composite human segmentation, wherein each of the first human segmentation and the second human segmentation includes information indicating an outline of a shape of the human, and wherein the generating of the second human segmentation from the image comprises:
   reducing a resolution of the image;
   inputting the image with the reduced resolution to the artificial intelligence trained model; and
   generating the second human segmentation from the image based on an output of the artificial intelligence trained model.

2. The method of claim 1, further comprising:
determining a template coefficient based on the face detection,
wherein at least one of a size, direction, or a location of the pre-defined full human body template is adjusted based on the template coefficient to generate the first human segmentation.

3. The method of claim 1, wherein the first human segmentation is generated by:
aligning the pre-defined full human body template to the human detected in the image;
selecting a part of the pre-defined full human body template; and
refining the selected part of the pre-defined full human body template.

4. The method of claim 1, wherein the image is a live preview image captured by a camera of the electronic device.

5. The method of claim 1, further comprising refining the first human segmentation based on the image.

6. The method of claim 5, wherein the refining of the first human segmentation based on the image is provided by adjusting a boundary of the first human segmentation using a color similarity based refinement method.

7. The method of claim 1, further comprising:
obtaining a structured light data; and
segmenting each human in the image separately based on the structured light data and the composite human segmentation.

8. The method of claim 1, wherein the artificial intelligence trained model is a trained model which is trained using at least one of a deep neural network (DNN), machine learning, neural network, deep learning, or classification algorithm.

9. An electronic device for human segmentation in an image, the electronic device comprising:
a display;
a memory storing at least one instruction; and
a processor configured to execute the at least one instruction to:
   obtain the image comprising a human;
   perform face detection to detect the human in the image;
   generate a first human segmentation, without using a machine learning algorithm or neural network model, from the image by comparing a pre-defined full human body template and the detected human;
   generate a second human segmentation from the image by inputting the image to an artificial intelligence trained model;
   obtain a composite human segmentation representing the detected human by using both of the first human segmentation and the second human segmentation; and
   apply a bokeh effect in the image based on the composite human segmentation by:
     blurring the image, and
     blending the blurred image and information about the human obtained based on the composite human segmentation, wherein each of the first human segmentation and the second human segmentation includes information indicating an outline of a shape of the human, and wherein the processor, to generate the second human segmentation from the image, is further configured to execute the at least one instruction to:
   reduce a resolution of the image;
   input the image with the reduced resolution to the artificial intelligence trained model; and
   generate the second human segmentation from the image based on an output of the artificial intelligence trained model.

10. The electronic device of claim 9,
wherein the processor is further configured to execute the at least one instruction to determine a template coefficient based on the face detection, and
wherein at least one of a size, direction, or a location of the pre-defined full human body template is adjusted based on the template coefficient to generate the first human segmentation.

11. The electronic device of claim 9, wherein the first human segmentation is generated by:
aligning the pre-defined full human body template to the human detected in the image;
selecting a part of the pre-defined full human body template; and
refining the selected part of the pre-defined full human body template.

12. The electronic device of claim 9, wherein the image is a live preview image captured by a camera of the electronic device.

13. The electronic device of claim 9, wherein the processor is further configured to execute the at least one instruction to refine the first human segmentation based on the image by adjusting a boundary of the first human segmentation using a color similarity based refinement method.

14. The electronic device of claim 9, wherein the processor is further configured to execute the at least one instruction to:
obtain a structured light data; and
segment each human in the image separately based on the structured light data and the composite human segmentation.

15. The electronic device of claim 9, wherein the artificial intelligence trained model is a trained model which is trained using at least one of a deep neural network (DNN), machine learning, neural network, deep learning, or classification algorithm.

16. A non-transitory computer-readable recording medium having recorded thereon a program which, when executed by a computer, performs a method of human segmentation in an image, by a device, the method comprising:
obtaining the image comprising a human;

performing face detection to detect the human in the image;

generating a first human segmentation, without using a machine learning algorithm or neural network model, from the image by comparing a pre-defined full human body template and the detected human;

generating a second human segmentation from the image by inputting the image to an artificial intelligence trained model;

obtaining a composite human segmentation representing the detected human by using both of the first human segmentation and the second human segmentation; and applying a bokeh effect in the image based on the composite human segmentation by:
  blurring the image, and
  blending the blurred image and information about the human obtained based on the composite human segmentation, wherein each of the first human segmentation and the second human segmentation includes information indicating an outline of a shape of the human, and wherein the generating of the second human segmentation from the image comprises:
  reducing a resolution of the image;
  inputting the image with the reduced resolution to the artificial intelligence trained model; and
  generating the second human segmentation from the image based on an output of the artificial intelligence trained model.

\* \* \* \* \*